(12) United States Patent
Stein et al.

(10) Patent No.: US 6,219,194 B1
(45) Date of Patent: Apr. 17, 2001

(54) MR HEAD READ AMPLIFIER WITH IMPROVED WRITE TO READ RECOVERY TIME

(75) Inventors: Anatoli B. Stein, Los Altos; Serguei Pantchenko, Mountain View, both of CA (US)

(73) Assignee: Guzik Technical Enterprises, San Jose, CA (US)

( * ) Notice: Subject to any disclaimer, the term of this patent is extended or adjusted under 35 U.S.C. 154(b) by 0 days.

(21) Appl. No.: 09/289,207

(22) Filed: Apr. 9, 1999

(51) Int. Cl.[7] ............... G11B 5/03; G11B 5/02; G11B 15/12

(52) U.S. Cl. ............... 360/66; 360/67; 360/62

(58) Field of Search ............... 360/46, 62, 66, 360/67; 330/62, 252

(56) References Cited

U.S. PATENT DOCUMENTS 5,331,478 * 7/1994 Aranovsky ............... 360/67

* cited by examiner

Primary Examiner—W. Chris Kim
(74) Attorney, Agent, or Firm—McDermott, Will & Emery

(57) ABSTRACT

An apparatus for substantially eliminating a switching voltage transient in a magnetic recording system so as to minimize a write-to-read recovery time includes a first bias enable switch, a bias current source responsive to the first bias enable switch, an MR sensor for receiving a bias current from the current source, and a read amplifier being capacitively coupled to the MR sensor. The bias current flowing through the MR sensor produces the switching voltage transient due to the RC time constant presented by the input of the read amplifier. The apparatus includes a first compensating circuit for generating a compensating voltage transient having a polarity substantially equal and opposite to the switching transient. The first compensating circuit is electrically coupled to the MR sensor, and a superposition of the switching voltage transient and the compensating voltage transient is substantially zero.

13 Claims, 5 Drawing Sheets

MR HEAD READ AMPLIFIER WITH IMPROVED WRITE TO READ RECOVERY TIME

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention relates to systems for reading stored data, and more particularly, to systems that utilize a magneto-resistive head to read data recorded on magnetic media.

BACKGROUND OF THE INVENTION

High-capacity computer storage devices typically include one or more electro-magnetic transducers and a corresponding number of magnetic media disks. The transducers, also known in the art as "heads," are adapted for transfer of electronic information between a data source, for example a computer, and data locations on the magnetic disks. Information is communicated in accordance with well-known conventions and formats that enable high-density storage, rapid access to data locations, high reliability, data integrity, and device miniaturization. A magneto-resistive (hereinafter referred to as MR) head is one of several types of electro-magnetic transducers known in the art. In general, an MR head includes an inductive component to write data and an MR sensor component to read data from magnetic media. In order to be active, the MR sensor requires an electrical bias current $I_B$ during the reading process. This bias current $I_B$ generally needs to be turned off during the writing process. FIG. 1 illustrates a simplified schematic of a prior art circuit 10 for generating a bias current $I_B$ for an MR sensor and for amplifying the underlying read signal produced by the MR head. FIG. 2 illustrates a number of curves representing various time varying voltages from the circuit 10 of FIG. 1.

In this prior art system, the MR sensor 12 is differentially AC coupled through capacitors 14 and 16 of value C to the read amplifier (READ AMP) 18. A biasing network including resistors 20 and 22 of value R supply DC biasing to the inputs of amplifier 18. Operational Amplifiers (OP AMPs) 24 and 26 provide the bias current through MR sensor 12 by developing a differential voltage across the series combination of resistors 28 and 30 and MR sensor 12 which has an equivalent resistance value of $R_{MR}$. When the bias enable switch 32 is closed, the voltage developed by the DAC 34 is amplified by the OP AMPs 24 and 26 to produce voltage $+V_B$ at the top of $R_B$ 28 and $-V_B$ at the bottom of $R_B$ 30. This results in the bias current $I_B$ as follows:

$$I_B = \frac{2V_B}{(2R_B + R_{MR})}$$

Because the voltage developed by the two Operational Amplifiers 24 and 26 is differential, the common-mode voltage $V_{MR}$ across the MR head 12 is close to ground potential so as to prevent electrostatic discharge (ESD) damage to the MR head. The absolute value of the bias current $I_B$ can be adjusted by changing the voltage at the output of DAC 34 to fit the precise MR sensor and magnetic media characteristics.

The Bias Enable Switch 32 turns the bias current $I_B$ off during the write operation and turns $I_B$ on during the read operations. Turning on $I_B$ at the beginning of the read operation produces an undesired voltage transient at the differential input terminals of the READ AMP 18, as illustrated by curve 56 in FIG. 2. The switch 32 closes at time $t=T_0$, applying the output voltage of DAC 34 to the inputs of the OP AMPs 24 and 26, as shown by curve 50. The DAC output voltage is amplified to produce the differential voltage represented by curve 52 across the outputs of OP AMPs 24 and 26. This differential voltage (driven across the series network of two bias resistors 28 and 30 and the MR sensor 12) results in a bias current $I_B$ through the MR sensor 12. The current $I_B$ flowing through the MR sensor 12 develops voltage $V_{MR}$ represented by curve 54 across the MR sensor 12. A typical value of the MR sensor resistance ($R_{MR}$) is 40 ohms, and a typical value of bias current $I_B$ is 10 mA; thus the voltage $V_{MR}$ developed across the MR sensor 12 when the switch 32 is closed may be expected to be on the order of 400 mV, with a relatively fast rise time because of a relatively small time constant. The inputs of the READ AMP 18 are capacitively coupled to the MR sensor 12 to block the DC voltage, while providing a path for a read signal from the MR sensor 12 having a bandwidth from a few hundred KHz (e.g., 300 KHz). To minimize distortion of low frequency components of the read signal, the time constant $T_C$ of the READ AMP input must be fairly large, on the order of 50 microseconds. The time constant $T_C$ may be determined from the following equation (approximately, considering that $R_{MR}$ is relatively small):

$$T_C = (2R) \times \frac{C}{2} = RC$$

After $t=T_0$, a voltage transient is superimposed on the read signal from the MR sensor 12 across the inputs of the READ AMP 18, as represented by curve 56 shown in FIG. 2. The transient decays exponentially as expressed by the following equation:

$$V_{RD} = e^{-\frac{(t-T_0)}{T_C}}$$

This decay is unacceptably long because it causes the head amplifier to saturate. Since a saturated head amplifier distorts the underlying read signal from the MR sensor 12, a significant portion of the magnetic track is wasted; the system can not effectively process the read signal until the transient sufficiently decays and the head amplifier returns to its linear operating region. It is therefore desirable to reduce the length of the transient to as short a duration as possible.

It is an object of the present invention to substantially overcome the above-identified disadvantages and drawbacks of the prior art.

SUMMARY OF THE INVENTION

The foregoing and other objects are achieved by the invention which in one aspect comprises an apparatus for substantially eliminating a switching voltage transient in a magnetic recording system so as to minimize a write-to-read recovery time. The magnetic recording system includes a first bias enable switch, a bias current source responsive to the first bias enable switch, an MR sensor for receiving a bias current from the current source, and a read amplifier being capacitively coupled to the MR sensor. The bias current flowing through the MR sensor produces the switching voltage transient. The apparatus includes a first compensating circuit for generating a compensating voltage transient having a polarity substantially equal and opposite to the switching transient. The first compensating circuit is electrically coupled to the MR sensor, and a superposition of the switching voltage transient and the compensating voltage transient is substantially zero.

In another embodiment, the first compensating circuit includes a first voltage source that produces a first output voltage responsive to the first bias enable switch. The first compensating circuit also includes a first conditioning circuit for applying an offset to the first output voltage and for varying an amplitude of the first output voltage, so as to produce a first conditioned voltage. The first compensating circuit further includes a first voltage-to-current converter for producing a first compensating current corresponding to the conditioned voltage. The first voltage-to-current converter is electrically coupled to the MR sensor such that the first compensating current is drawn from the bias current source.

In another embodiment, the bias current source supplies additional current drawn by the first compensating circuit, such that the first compensating circuit does not reduce the bias current flowing through the MR sensor.

In another embodiment, the first voltage source includes a digital-to-analog converter electrically coupled to a second bias enable switch. In this embodiment, the second bias enable switch is responsive to the first bias enable switch. In alternative embodiments, the two switches change state at the same time and the state of the second switch is always the same as the state of the first switch.

In another embodiment, the apparatus includes a second compensating circuit for providing the compensating current drawn by the first compensating circuit. The second compensating circuit may include a second voltage source for producing a second output voltage responsive to the first bias enable switch, a second conditioning circuit for applying an offset to the second output voltage and for varying an amplitude of the second output voltage, so as to produce a second conditioned voltage, and a second voltage-to-current converter for producing a second compensating current corresponding to the conditioned voltage. The second voltage-to-current converter is electrically coupled to the MR sensor, such that the first compensating current is drawn from the second compensating circuit.

In another embodiment, the first output voltage and the second output voltage are generated by a common voltage source.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 3:
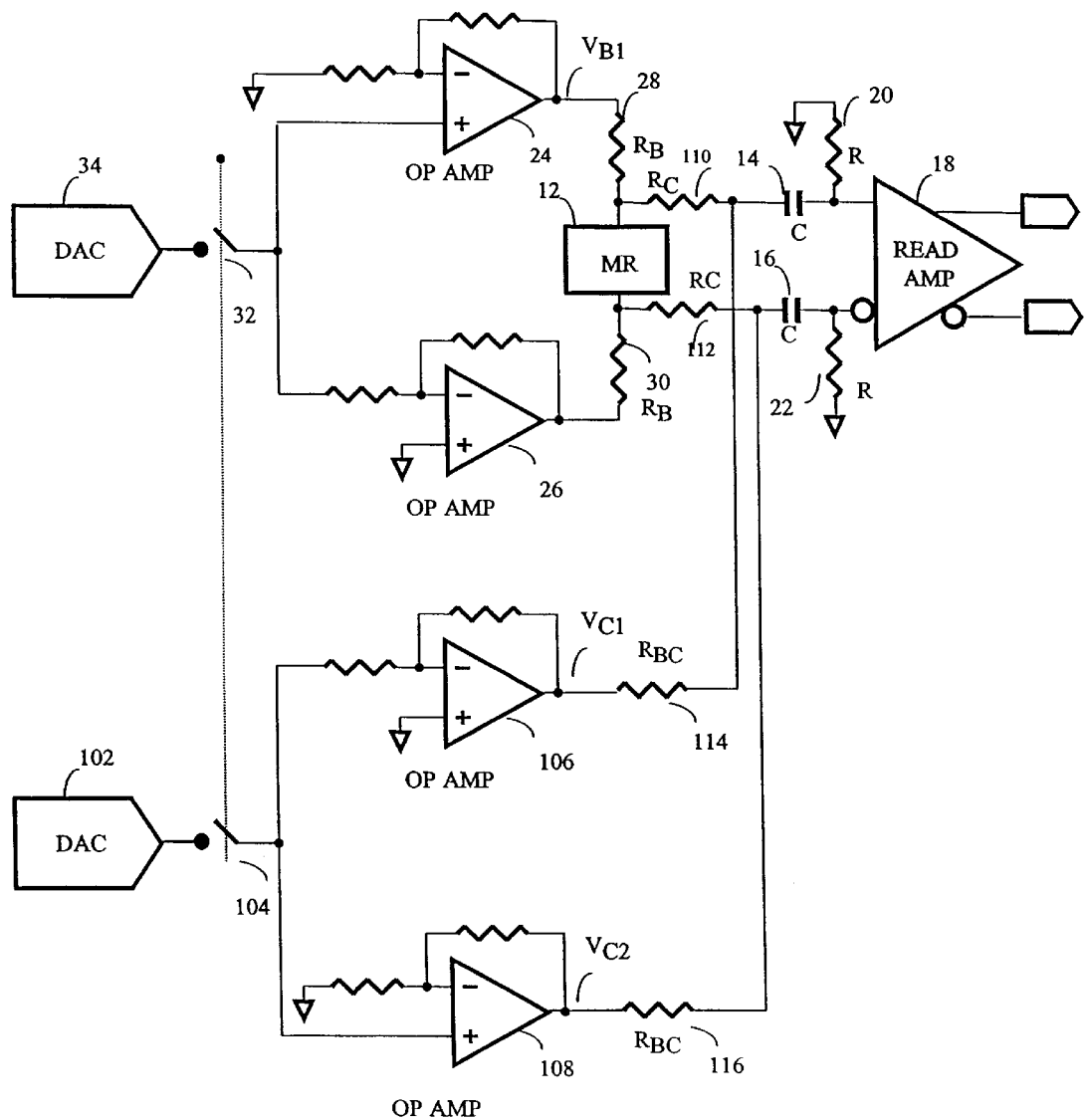
FIG. 3 shows a schematic view of one preferred embodiment of an apparatus for substantially eliminating a switching voltage transient in a magnetic recording system.
Figure 4:
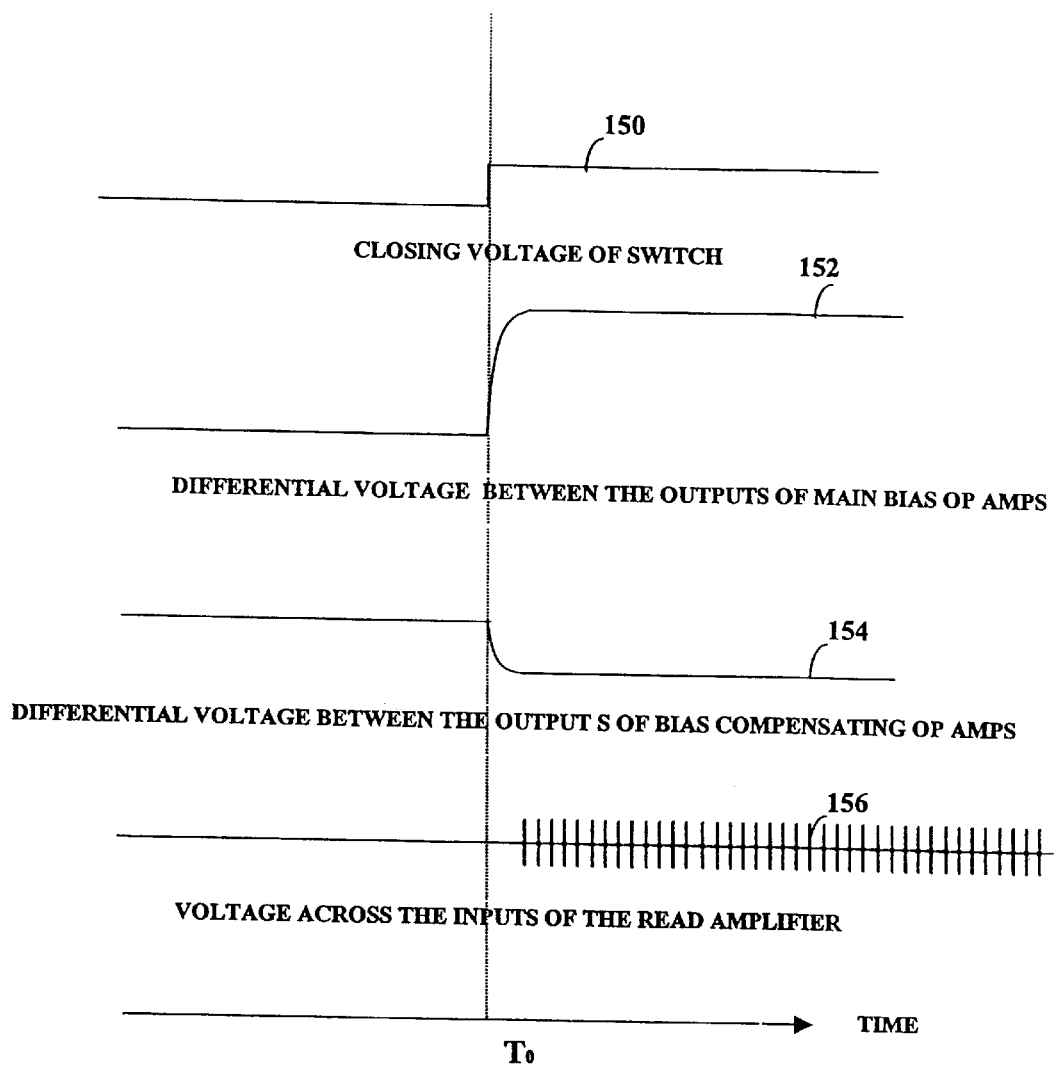
FIG. 4 illustrates a number of curves representing various time varying voltages from the circuit of FIG. 3; and, FIG. 5 illustrates another embodiment of the apparatus shown in FIG. 3.

FIG. 3 shows a schematic view of one preferred embodiment of an apparatus for substantially eliminating a switching voltage transient in a magnetic recording system so as to minimize a write-to-read recovery time. This embodiment includes a compensation circuit 100, in addition to the components described in FIG. 1. The compensation circuit 100 includes a second DAC 102, a second bias enable switch 104, two OP AMPs 106 and 108 and additional resistors 110, 112, 114 and 116. The operation of the preferred embodiment may be understood more clearly by referring to the curves in the timing diagrams shown in FIG. 4. The two switches 32 and 104 are opened and closed simultaneously, so during the read operation two voltages are applied to the MR sensor biasing network simultaneously: the differential voltage 152 from the main bias OP AMPs 24 and 26 and the differential voltage 154 from the bias compensating OP AMPs 106 and 108.

Figure 1:
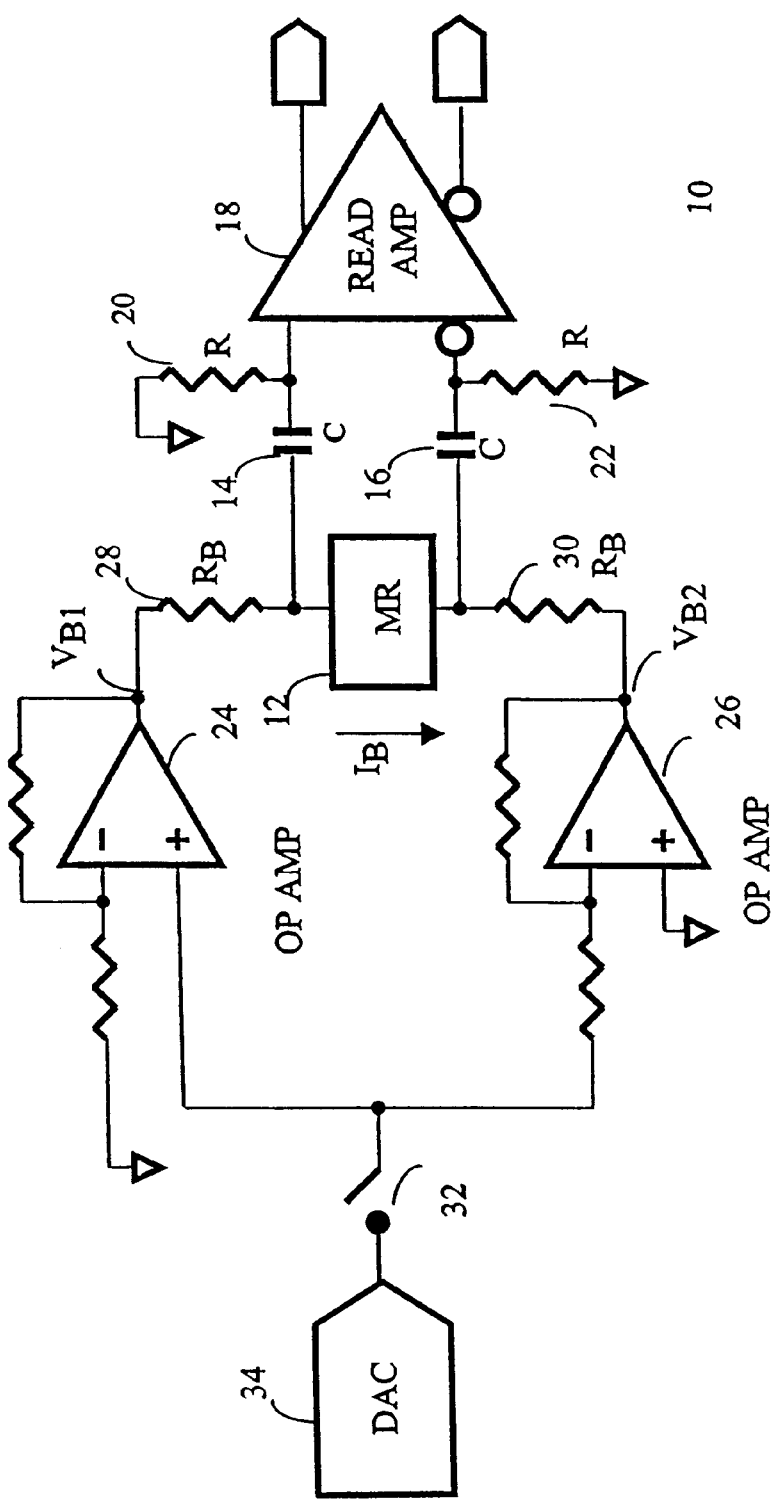
FIG. 1 shows a schematic of a prior art circuit for generating an MR sensor bias current and for amplifying the underlying read signal produced by the MR head.
Figure 2:
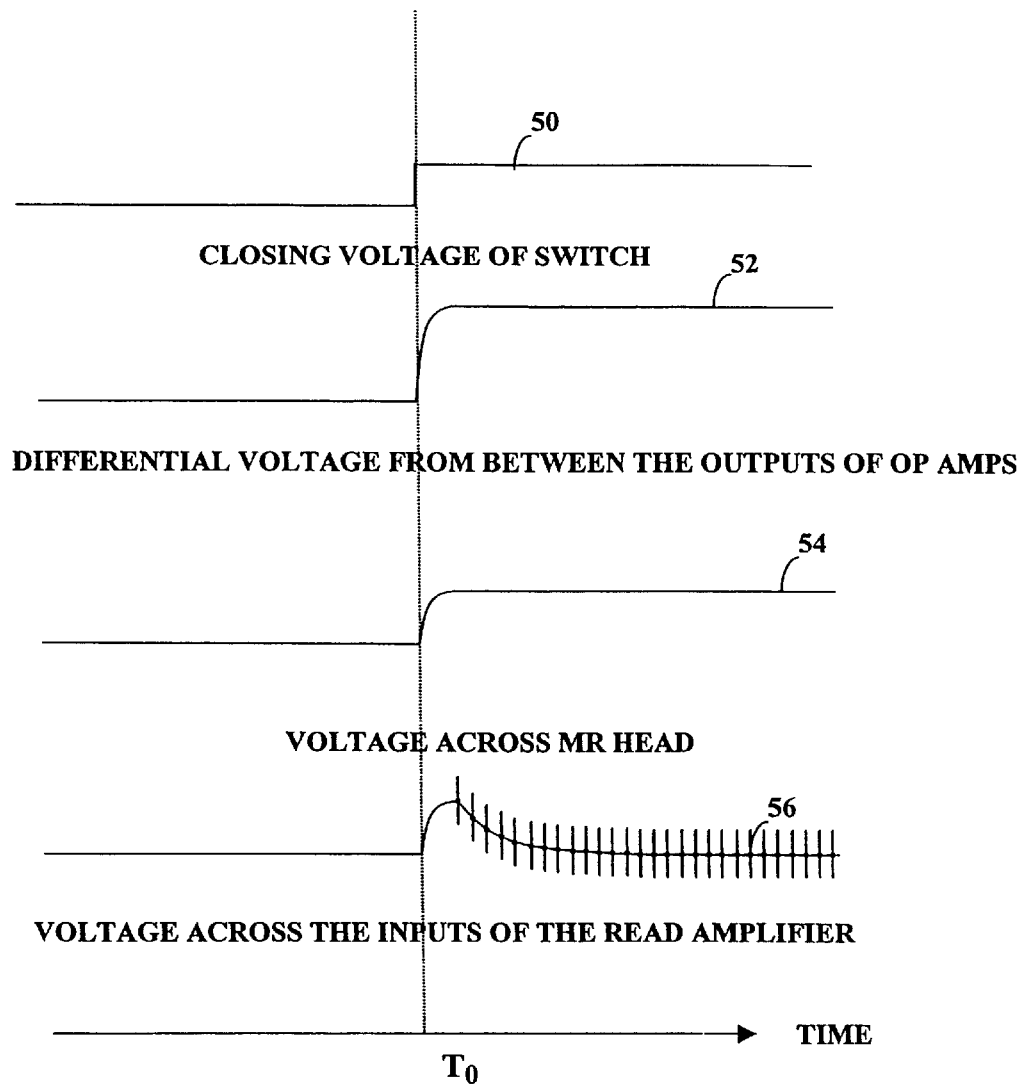
FIG. 2 illustrates a number of curves representing various time varying voltages from the circuit of FIG. 1.

In this embodiment, the differential voltage represented by curve 152 is increased with respect to the prior art uncompensated circuit shown in FIG. 1 to exactly compensate for the additional current drawn by the compensating OP AMPs 106 and 108. This increase insures that the bias current $I_B$ through MR sensor 12 remains the same as in the uncompensated circuit. The additional current drawn by the compensating OP AMPs 106 and 108 flows through resistors 110 and 112, creating a voltage drop across the resistors. The magnitude of this additional current and the resistor values $R_C$ are chosen so that the total drop across resistors 110 and 112 is equal to the voltage drop created by the bias current in the MR sensor 12. The change in voltage seen at the capacitors 14 and 16 due to the state change of the bias enable switch 32 is substantially zero, thereby eliminating the transient and resulting in no voltage change at the inputs of the READ AMP 18, as shown by curve 156 in FIG. 4.

The resistance value $R_C$ should be small as compared to the resistance of the MR sensor $R_{MR}$ to minimize the noise added to the read signal produced by the MR sensor 12. This necessitates that the extra current produced by the OP AMPs 106 and 108 be larger than the uncompensated bias current.

The values of the voltages that need to be supplied by the compensating OP AMPs 106 and 108 are calculated as follows: when the bias current $I_B$ is applied to the MR sensor 12 the voltage generated across it is $V_{MR}=I_B*R_{MR}$ as described herein. To eliminate the superimposed voltage transient at the input of the READ AMP18, the total drop seen at the left side of the capacitors 14 and 16 must be zero. Therefore, the voltage across each of the resistors 110 and 112 is $$V_{RC}=V_{MR}/2=I_B*R_{MR}/2,$$

and the current through resistors 110 and 112 is $$I_{RC}=V_{RC}/R_C=I_B*R_{MR}/2*R_C.$$

The voltage $V_{C1}$ at the output of OP AMP 106, once the value of $R_{BC}$ is chosen independently, must be $$V_{C1}=-I_{RC}*R_{BC}=-I_B*R_{MR}*R_{BC}/2*R_C,$$

and the voltage $V_{C2}$ at the output of OP AMP 108 must be the negative of $V_{C1}$, i.e., $$V_{C2}=I_B*R_{MR}*R_{BC}/2R_C.$$

To calculate the voltage required at the output of OP AMP 24, it may be observed that the total current $I_B{}'$ supplied by the OP AMP 24 is $$I_B{}'=I_B+I_{RC}=I_B+I_B*R_{MR}/2*R_C=I_B*(1+R_{MR}/2*R_C).$$

The voltage $V_{B1}$ required to be generated by OP AMP 24 is comprised of half the voltage across the MR sensor 12 plus the voltage drop across $R_B$, so $$V_{B1}=I_B*R_{MR}/2+I_B{}'*R_B=I_B*R_{MR}/2+I_B*R_B*(1+R_{MR}/2*R_C)\ V_{B1}=I_B*(R_{MR}/2+R_B+R_B*R_{MR}/2*R_C).$$

The voltage $V_{B2}$ that must be generated by OP AMP 26 is the negative of $V_{B1}$, i.e., $-V_{B1}$. The calculated values $V_{B1}$, $V_{B2}$, $V_{C1}$ and $V_{C2}$ (and thus of the bias and compensation currents) are programmed by appropriate settings of DAC 34 and DAC 102, based on the required bias current and known value of MR sensor resistance $R_{MR}$.

Figure 5:
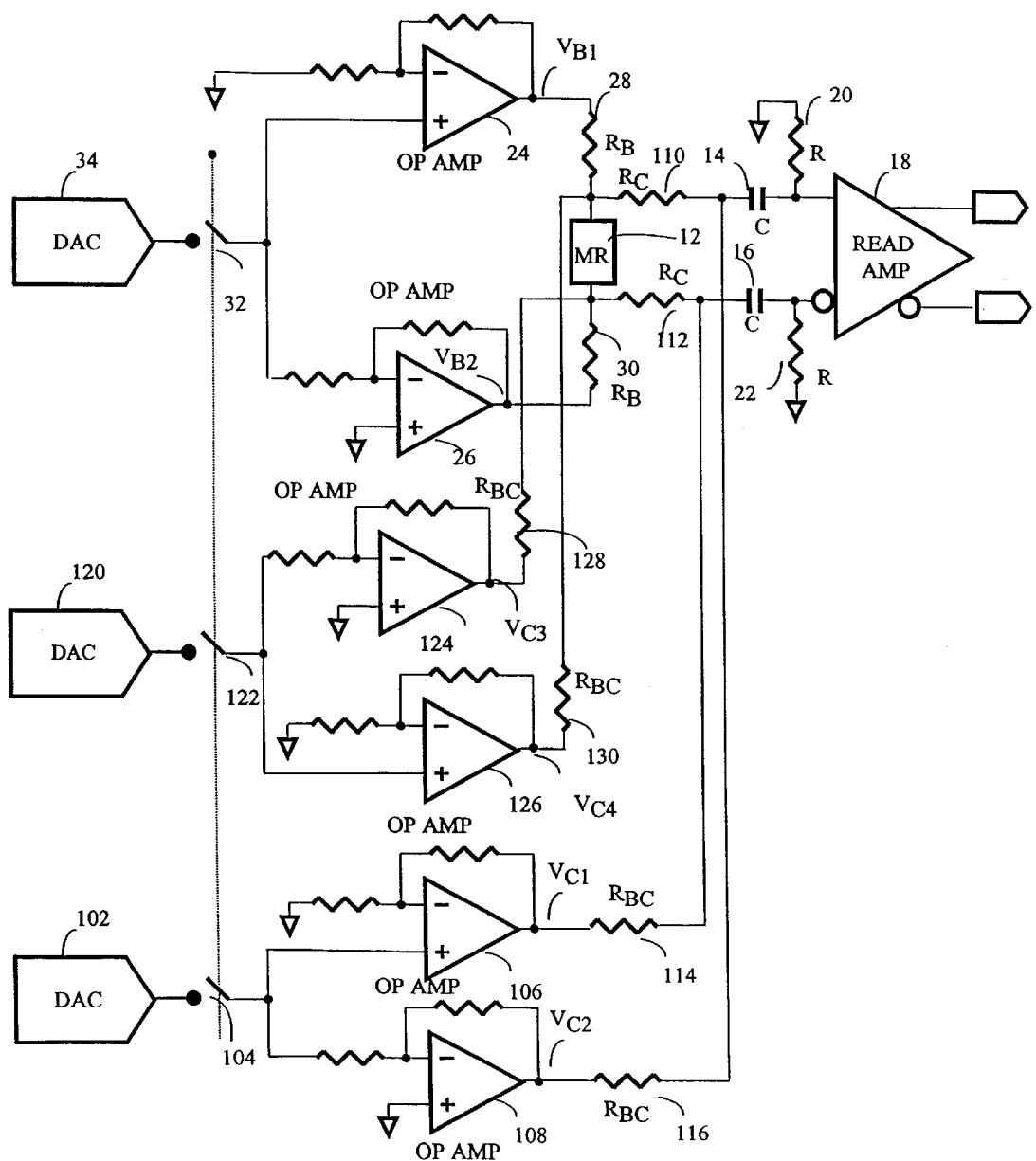

Another embodiment of the invention is shown in FIG. 5. An additional DAC 120, switch 122, OP AMPs 124 and 126 and resistors 128 and 130 are added to the embodiment shown in FIG. 3. The switches 32, 104, and 122 change state simultaneously. The additional components inject enough current into the bias/compensation network surrounding the MR sensor 12 to exactly cancel the current drawn by the OP AMPs 106 and 108. The OP AMPS 124 and 126 develop a positive differential voltage at exactly the same time and having the same magnitude as the negative differential voltage generated by OP AMPS 106 and 108. The advantage of this embodiment is that the OP AMPs 24 and 26 establish the MR sensor bias current $I_B$ independent of the compensating current, resulting in greater accuracy of the bias current setting. In one embodiment, OP AMPs 106, 108, 124 and 126 are connected together such that they all receive the output of DAC 120. This embodiment is possible because in many cases, the voltage and compensating current to be provided by OP AMP 124 are equal to the voltage and compensating current, respectively, to be provided by OP AMP 108. Similarly, the voltage and compensating current to be provided by OP AMP 126 are often equal to the voltage and compensating current, respectively, to be provided by OP AMP 106.

The values of the voltages that must be supplied by the OP AMPs 24 and 26 can be calculated as follows: the OP AMP 24 must only supply the uncompensated bias current $I_B$ for the MR sensor 12. Thus, in this embodiment, the voltage $V_{B1}$ that the OP AMP 24 generates is $$V_{B1}=I_B*(R_B+R_{MR}/2),$$

and the voltage $V_{B2}$ that the OP AMP 26 generates is the negative of the voltage from OP AMP 24, i.e., $V_{B2}=-V_{B1}$. As in the previously described embodiment, the voltage $V_{C1}$ at the output of OP AMP 106 must be $$V_{C1}=-I_{RC}*R_{BC}=-I_B*R_{MR}*R_{BC}/2*R_C,$$

and the voltage $V_{C2}$ at the output of OP AMP 108 must be the negative of $V_{C1}$, i.e., $$I_B*R_{MR}*R_{BC}/2*R_C.$$

To calculate the voltage $V_{C3}$ required at the output of OP AMP 124, it may be observed that now it only supplies $I_{RC}$, therefore the voltage $V_{C3}$ at its output must be $$V_{C3}=I_B*R_{MR}/2+I_{RC}*R_{BC}=I_B*R_{MR}/2+R_{BC}*I_B*R_{MR}/2*R_C V_{C3}=I_B*(R_{MR}/2+R_{BC}*R_{MR}/2*R_C).$$

The OP AMP 126 must produce a voltage $V_{C4}$ that is the negative of $V_{C3}$, i.e., $V_{C4}=-V_{C3}$. The voltages $V_{C1}$ and $V_{C2}$ are set by adjusting the output of DAC 34, and the voltages $V_{C3}$ and $V_{C4}$ are set by adjusting the output of DAC 102.

The main utility of the present invention is its ability to substantially eliminate the read/write switching transient superimposed on the read signal generated by the MR sensor by adding the compensating components described herein. The embodiment illustrated by FIG. 5 eliminates the transient without affecting the source of the bias current through the MR sensor.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An apparatus for substantially eliminating a switching voltage transient in a magnetic recording system so as to minimize a write-to-read recovery time, said magnetic recording system including a first bias enable switch, a bias current source responsive to said first bias enable switch, an MR sensor for receiving a bias current from said current source, and a read amplifier being capacitively coupled to said MR sensor, wherein said bias current flowing through said MR sensor produces said switching voltage transient, comprising:

a first compensating circuit for generating a compensating voltage transient having a polarity substantially equal and opposite to said switching transient, said first compensating circuit being electrically coupled to said MR sensor, wherein a superposition of said switching voltage transient and said compensating voltage transient is substantially zero.

2. An apparatus according to claim 1, wherein said first compensating circuit includes a first voltage source for producing a first output voltage responsive to said first bias enable switch, a first conditioning circuit for applying an offset to said first output voltage and for varying an amplitude of said first output voltage, so as to produce a first conditioned voltage, and a first voltage-to-current converter for producing a first compensating current corresponding to said conditioned voltage, wherein said first voltage-to-current converter is electrically coupled to said MR sensor such that said first compensating current is drawn from said bias current source.

3. An apparatus according to claim 2, wherein said bias current source supplies additional current drawn by said first compensating circuit, such that said first compensating circuit does not reduce said bias current flowing through said MR sensor.

4. An apparatus according to claim 2, wherein said first voltage source includes a digital-to-analog converter electrically coupled to a second bias enable switch, said second bias enable switch being responsive to said first bias enable switch.

5. An apparatus according to claim 4, wherein said first switch and said second switch change state simultaneously and a state of said second switch is always the same as a state of said first switch.

6. An apparatus according to claim 2, further including a second compensating circuit for providing said compensating current drawn by said first compensating circuit.

7. An apparatus according to claim 6, wherein said second compensating circuit includes a second voltage source for producing a second output voltage responsive to said first bias enable switch, a second conditioning circuit for applying an offset to said second output voltage and for varying an amplitude of said second output voltage, so as to produce a second conditioned voltage, and a second voltage-to-current converter for producing a second compensating current corresponding to said conditioned voltage, wherein said second voltage-to-current converter is electrically coupled to said MR sensor such that said first compensating current is drawn from said second compensating circuit.

8. An apparatus according to claim 7, wherein said first output voltage and said second output voltage are generated by a common voltage source.

9. A method for substantially eliminating a switching voltage transient in a magnetic recording system so as to minimize a write-to-read recovery time, said magnetic recording system including a first bias enable switch, a bias current source responsive to said first bias enable switch, an MR sensor for receiving a bias current from said current source, and a read amplifier being capacitively coupled to said MR sensor, wherein said bias current flowing through said MR sensor produces said switching voltage transient, comprising the steps of:

generating a compensating voltage transient having a polarity substantially equal and opposite to said switching transient;

electrically coupling said compensating voltage transient to said MR sensor, wherein a superposition of said switching voltage transient and said compensating voltage transient is substantially zero.

10. A method according to claim 9, further including the steps of generating said compensating voltage transient by drawing additional current from said bias current source, and directing said additional current through a resistor network being electrically coupled to said MR sensor, so as to produce a voltage drop across said resistor network.

11. A method according to claim 10, further including the step of applying a differential voltage across said resistor network so as to generate said additional current through said resistor network.

12. A method according to claim 9, further including the steps of generating said compensating voltage transient by drawing additional current from a compensating current source, and directing said additional current through a resistor network being electrically coupled to said MR sensor, so as to produce a voltage drop across said resistor network.

13. A method according to claim 12, further including the step of applying a differential voltage across said resistor network so as to generate said additional current through said resistor network.

* * * * *